United States Patent [19]

Lenac

[11] Patent Number: 4,737,277
[45] Date of Patent: Apr. 12, 1988

[54] VACUUM EXPRESSION BELT TRACKING AND CONTROL APPARATUS FOR ROTARY DRUM VACUUM FILTER

[75] Inventor: Nevio Lenac, Bridgeport, Conn.

[73] Assignee: Dorr-Oliver Incorporated, Stamford, Conn.

[21] Appl. No.: 926,488

[22] Filed: Nov. 3, 1986

[51] Int. Cl.$^4$ ................... B01D 33/06; B01D 33/08
[52] U.S. Cl. ................... 210/143; 210/386; 210/402; 210/404; 210/DIG. 3
[58] Field of Search .......... 210/770, 784, 91, 138, 210/143, 386, 402, 404, DIG. 3, 406; 100/43, 47, 48, 121, 153, 168; 162/252, 254, 262, 335, 358, 380

[56] References Cited

U.S. PATENT DOCUMENTS

| Re. 19,137 | 4/1934 | Wright et al. | 210/770 |
| 3,069,921 | 12/1962 | Davis | 210/DIG. 3 |
| 3,116,244 | 12/1963 | Davis et al. | 210/DIG. 3 |
| 4,077,834 | 3/1978 | Stark | 162/262 |
| 4,177,725 | 12/1979 | Gersbeck | 100/43 |

FOREIGN PATENT DOCUMENTS

| 796942 | 6/1958 | United Kingdom | 210/143 |
| 2140318 | 11/1984 | United Kingdom | 210/402 |

Primary Examiner—Richard V. Fisher
Assistant Examiner—Linda S. Evans
Attorney, Agent, or Firm—H. M. Snyder

[57] ABSTRACT

A rotary drum vacuum filter suitable for processing pulp slurries is provided with a vacuum expression belt. The invention provides a method and apparatus for tracking and controlling the belt during operation. The belt is positioned by a moveable frame for expressing filtrate from the pulp web and in operation a control unit monitors lateral movement of the belt with respect to the drum. When drifting occurs the belt is adjusted horizontally during operation to counter drift. The adjustment can be repeated as necessary. If continued drift cannot be corrected then the belt is moved vertically to an inoperative position.

3 Claims, 7 Drawing Sheets

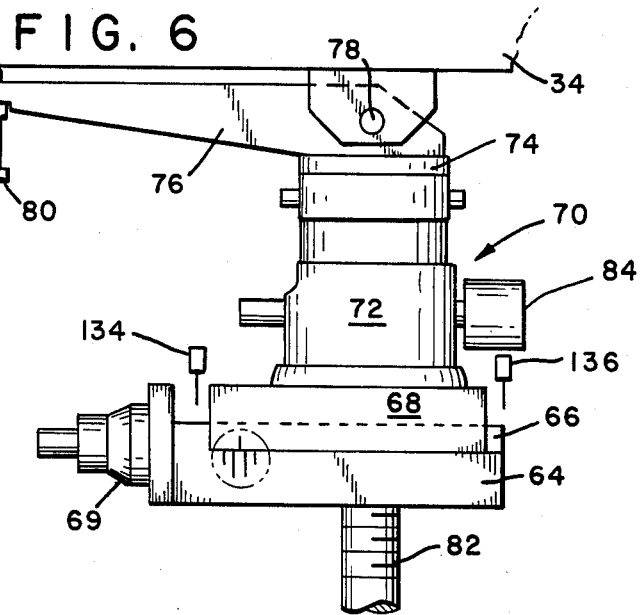
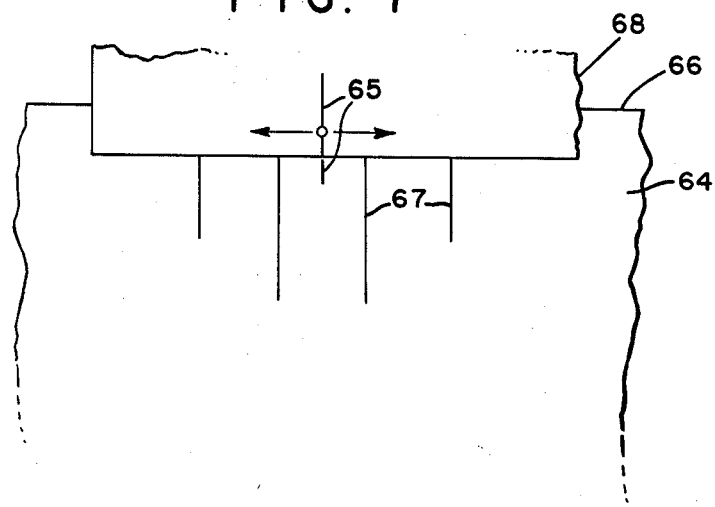

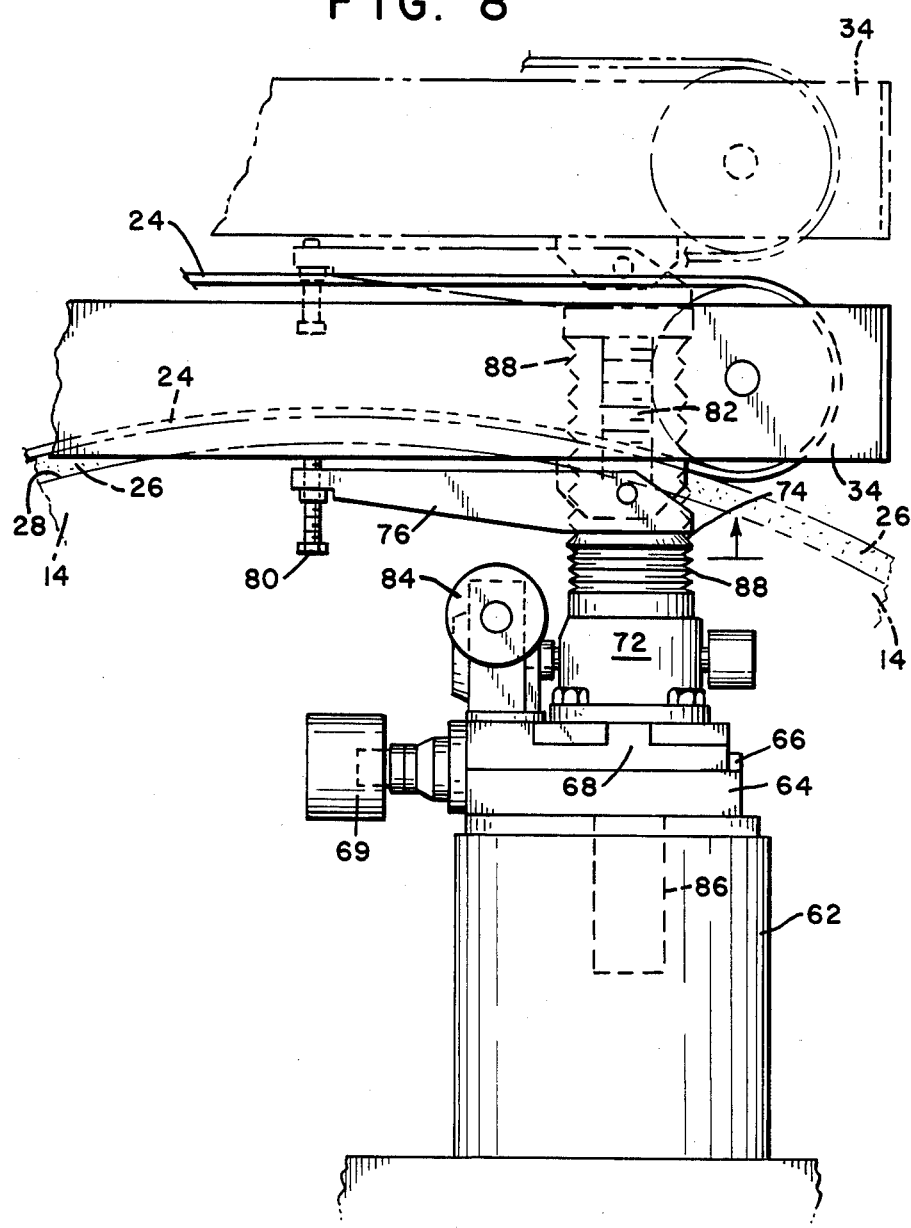

VACUUM EXPRESSION BELT TRACKING AND CONTROL APPARATUS FOR ROTARY DRUM VACUUM FILTER

BACKGROUND OF THE INVENTION

Rotary vacuum drum filters are well known for industrial and municipal applications for processing pulp, sewage, and other slurries to reduce their liquid content. In the pulp and paper industry such filters are used for brownstock washing and for filtering and washing pulp slurries. The filters generally comprise a rotary vacuum drum and vat assembly for extracting fluid from the slurry and for increasing its consistency from approximately 1% to 15% solid content. Typically, the drum is mounted for rotation in the vat with a filtering element such as a filter cloth provided about the drum. In the filtration cycle the drum emerges from the slurry at the feed end of the vat with a layer or web of filter cake on its surface and passes through a wash zone where, in the case of processing brownstock, soda is washed from the pulp. Next the drum passes through a vacuum drainage zone where a vacuum source is applied to the interior of the drum and by appropriate valving to a sector of the drum surface. In the vacuum drainage zone the evacuated drum draws liquid from the pulp or filter cake through interior piping for external recovery. Thereafter the drum rotates through a vacuum cut-off zone and a discharge zone where the pulp or filter cake is removed from the drum by a doctor blade and the cycle is repeated.

For efficient operation of the rotary vacuum drum filter it is necessary that the filter cake be substantially dewatered to a consistency of approximately 15% prior to removal and that the filter cake be of uniform consistency.

To aid in dewatering the filter cake during the filtration cycle vacuum expression devices are used which comprise an endless impervious expression belt extending across the vacuum drainage zone of the filter drum and engaging the filter cake for a portion of the circumference of the drum. A vacuum expression belt operates by means of the pressure differential created during the vacuum portion of the filtration cycle and presses the filter cake against the drum to aid in filtrate removal. The belt is mounted over spaced support rollers and positioned by suitable supporting structures in longitudinal alignment with the drum and with the inner run of the belt substantially parallel to the drum surface. The belt itself is not independently driven, however, it is carried along by engagement of the belt with the filter cake carried on the surface of the drum. The vacuum expression belt is a lamination including an interior nylon carcass with inner and outer rubber layers. The belt is preferably joined by a lap joint diagonally extending across the belt surface.

The confronting surfaces of the belt and the drum are never completely parallel because of the substantial width of the vacuum expression belt in comparison to its length in the direction of drum rotation, limitations inherent in machine design and adjustment, and variations in the thickness of filter cake during operation. As a result the vacuum expression belt tends to migrate or drift to one end or the other of the rotating vacuum filter drum. If the belt drifts off its rollers during operation there is danger of direct loss of the belt as well as consequential loss of production time while the belt is being replaced. Ordinarily, rotary vacuum drum filters operate in a harsh environment making belt replacement arduous and hazardous. It is very desirable that belt replacement occur only during scheduled periods for equipment maintenance or overhaul.

The present invention is directed to an apparatus for mounting a vacuum expression belt on a rotary vacuum filter system, for monitoring belt position during operation, adjusting the position of the apparatus as necessary to maintain the belt in normal operating position, and for inactivating the belt if unusual operating conditions occur.

SUMMARY OF THE INVENTION

The vacuum expression belt assembly according to the present invention includes spaced leading and trailing support rollers carried for rotation by end frames lying along opposite, i.e., valve and drive, ends of the vat. The vacuum expression belt is supported by the rollers and overlies the rotary vacuum drum and the inner run of the belt defines the vacuum expression zone. In the vacuum expression zone, the belt is in contact with the filter cake and air is sealed from the pulp sheet filter cake while the belt squeezes the sheet and expresses filtrate therefrom. The energy required to squeeze the pulp sheet comes from the drum's vacuum and there is very little pressure applied by the belt supporting rollers to the underlying drum and filter cake. Additionally, the belt is not independently driven, but rather, is driven through its engagement with the filter cake on the moving drum. During normal operation and true tracking of the vacuum expression belt, the inner run of the belt will be substantially parallel to the surface of the drum in the vacuum expression zone and the axis of each of the leading and trailing belt support rollers will be substantially parallel to the axis of the rotary drum.

Each of the roller supporting end frames is mounted for movement of the vacuum expression belt vertically with respect to the rotary drum between operational and inactive positions. The belt can be elevated to the inactive position as desired for maintenance and repair of equipment or for safety reasons if extraordinary operating conditions are encountered. Additionally, one of the end frames, preferably the frame located at the valve end of the vat, is pivoted on a vertical axis and the other end frame at the drive end of the vat is mounted on a horizontally oriented sliding base. The drive end frame is therefore capable of traveling from a fixed normal position forwardly towards the discharge side or rearwardly towards the feed box side of the vat. In the normal position the axis of each of the leading and trailing belt support rollers are substantially parallel to the drum axis. By this mounting arrangement, the vacuum expression belt assembly can be moved slightly in order to overcome the tendency of the belt to drift laterally during machine operation. The adjustment occurs when the belt assembly is pivoted slightly forwardly or rearwardly from normal setting so that the roller axes are no longer parallel to the drum axis. A control unit according to the present invention will adjust the belt assembly to direct the belt to a true tracking position.

During operation, the tracking of the vacuum expression belt is the same as tracking on any system of three rolls with the difference that the drum roll is of much larger diameter than the belt supporting rollers and additionally, the belt is under vacuum. Because of variations in belt alignment from normal occurring during machine operation, the belt tends to migrate toward one side or the other of the rotary drum. A control unit for the belt tracking mechanism according to the present invention continually monitors the position of the belt and will adjust the position of the belt supporting assembly to restore the belt to a normal tracking position. For example, if the belt begins migrating laterally toward the drive end of the drum then, by pivoting the belt assembly toward the feed box side of the vat, the belt adjusts its position by moving laterally towards the valve end of the drum to a normal tracking position. By means of such pivoting movement of the belt assembly toward the feed box or toward the discharge side of the rotary drum, the vacuum expression belt can be kept in a predetermined range of operational limits for proper tracking.

The control unit includes belt location sensors located adjacent the belt on both the drive and valve ends of the drum. In the event the belt begins drifting laterally on its rollers toward either end of the drum the control unit will direct the sliding roller support frame to move in a direction to adjust the drifting belt and to restore it to the drum centerline. Ordinarily, the first directive given by the control unit is sufficient to restore belt tracking to a normal operating position. However, there is a time delay of relatively short duration for the belt to be restored to the true tracking position. If the belt has not, then the control unit issues a second directive for further movement of the sliding frame for returning the belt to its normal position. This procedure can be repeated until the belt is properly positioned.

In the event the control unit is unable to restore the vacuum expression belt to the normal position and the belt continues migrating or drifting beyond a predetermined location thus indicating a serious operational problem with tracking of the vacuum belt, then the control unit actuates the belt assembly lifting mechanism, and the belt is lifted from operating to inactive position until the source of malfunction is identified and corrected. This step is necessary to avoid damage of the belt itself which is an expensive component and loss of production which entails considerable expense.

OBJECTS OF THE INVENTION

It is an object of the invention to provide a belt tracking unit for a rotary drum vacuum filter which efficiently and accurately maintains a vacuum expression belt in operative position with respect to the rotary drum.

It is another object of the invention to provide a moveable frame for a vacuum expression belt so that by slight frame movements the position of the belt can be kept tracking in normal operating position.

It is a further object of the invention to provide a control system for actuating a moveable frame and for monitoring the effectiveness of frame adjustments for belt integrity and for ensuring continuous drum operation.

A further object of the present invention is to provide a control system capable of repeated adjustments for enabling a belt tracking unit to maintain the belt in normal operating position.

A further object of the invention is to provide a control override unit to protect the integrity of the belt without interrupting a vacuum filter drum operation in the event the vacuum expression belt drifts beyond tolerable limits.

Other and further objects of the invention will become apparent on an understanding of the preferred embodiment hereafter to be described or upon employment of the invention practice.

DESCRIPTION OF THE DRAWING

A preferred embodiment of the invention has been chosen for illustrating the principles of the invention and is shown in the accompanying drawing in which:

FIG. 6 is a front elevational view of a sliding support for the vacuum expression belt assembly drive end frame.

FIG. 7 is an enlarged fragmentary view of the support of FIG. 6 showing bench marks for indicating frame movement.

FIG. 8 is a front elevational view of the drive end support frame shown in operative position (solid lines) with respect to the rotary drum and in an inoperative position (broken lines) with vacuum expression belt elevated above the rotary drum.

DETAILED DESCRIPTION OF THE INVENTION

Figure 1:
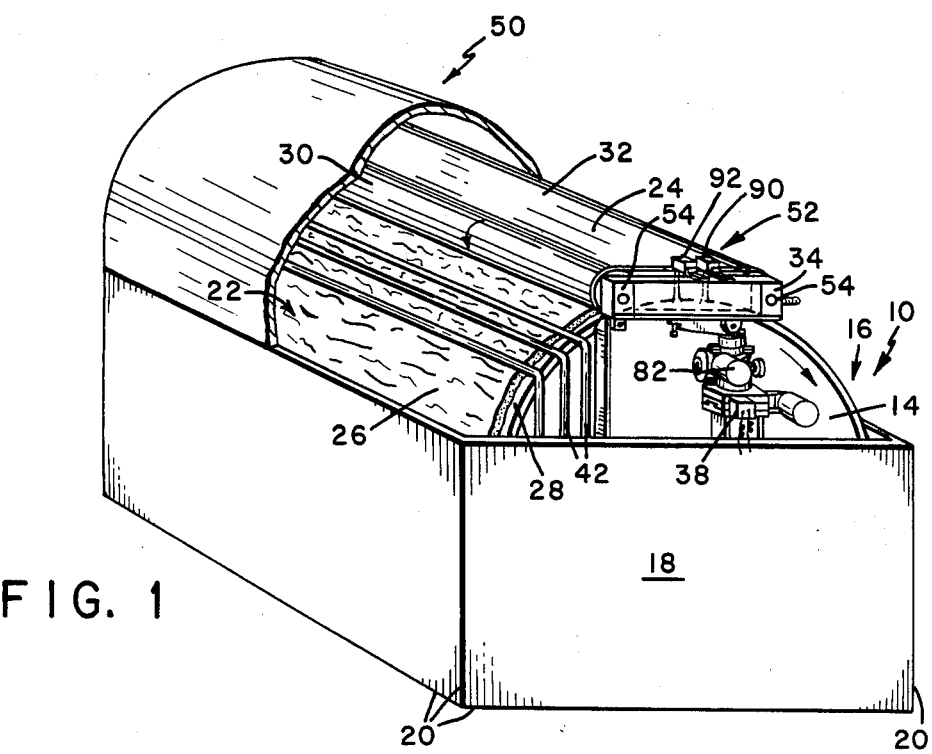
FIG. 1 is perspective view of a rotary drum vacuum filter with its cover broken away to illustrate the vacuum expression belt assembly in accordance with the present invention.
Figure 2:
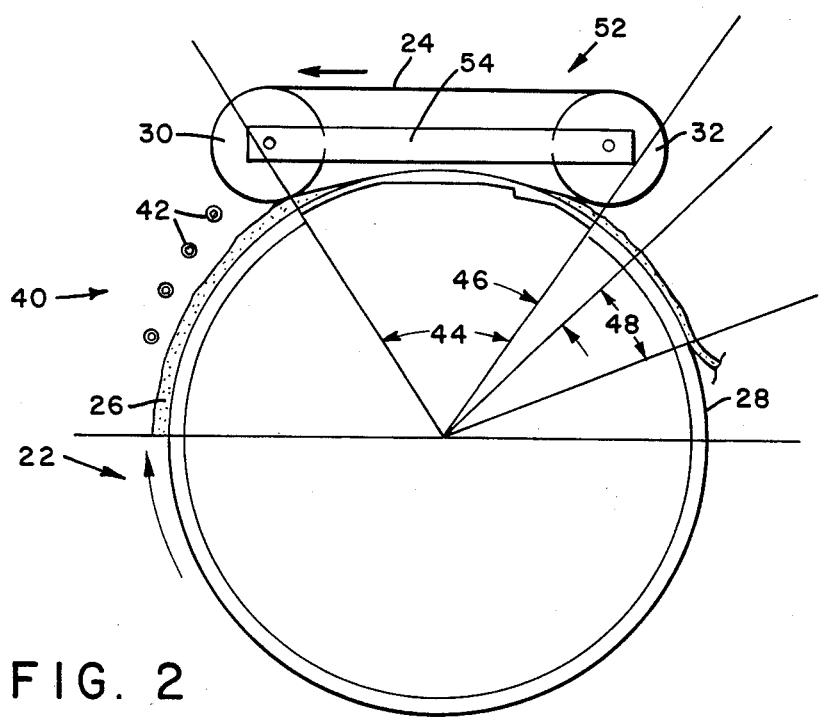
FIG. 2 is a schematic view of a vacuum expression belt in operative position with a rotary drum, and of the filtration cycle.
Figure 3:
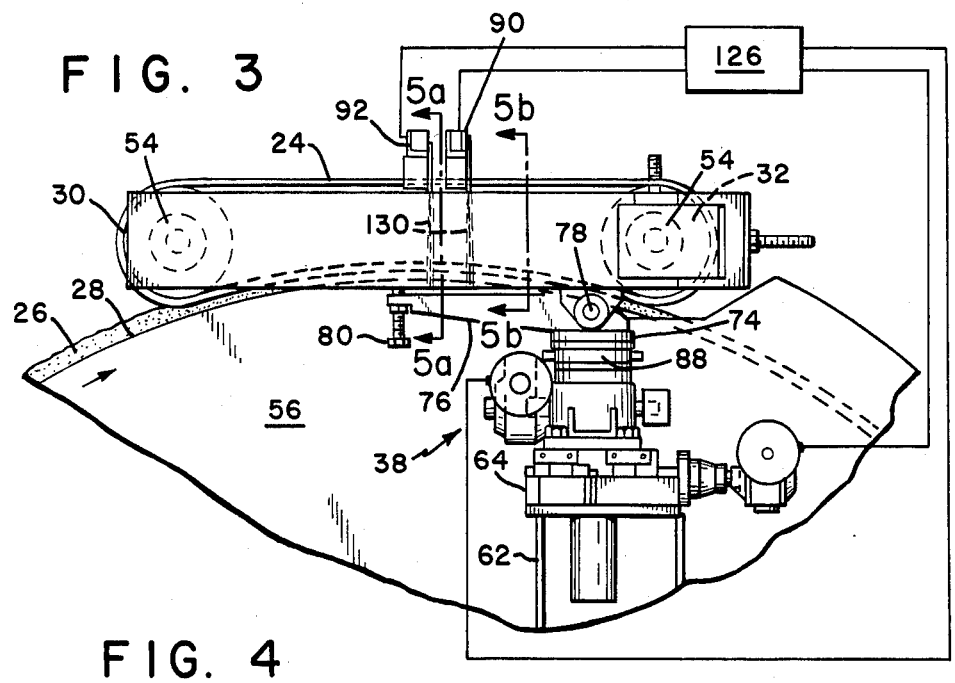
FIG. 3 is a fragmentary front elevation view of the rotary drum vacuum filter of FIG. 1 showing the assembly for mounting the vacuum expression belt at the drive end of the vacuum filter.
Figure 4:
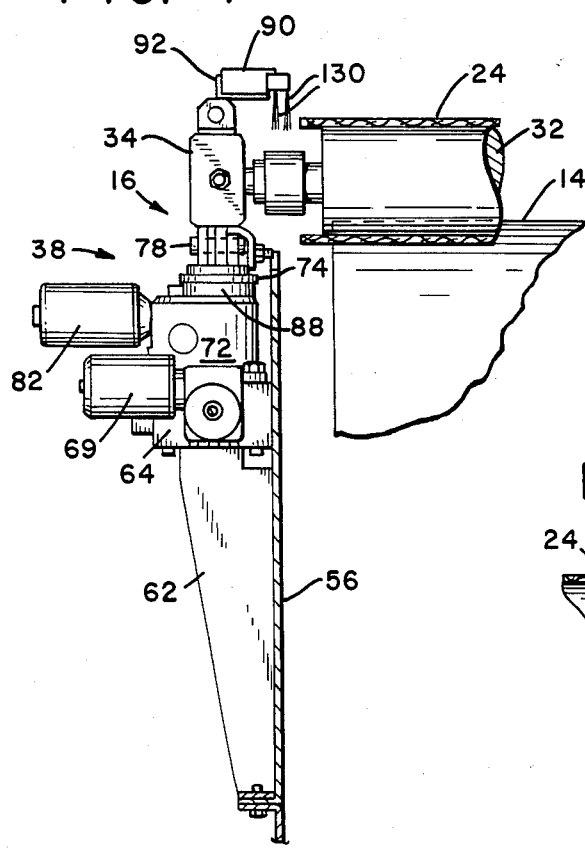
FIG. 4 is a fragmentary side elevational view of the assembly shown in FIG. 3.

Referring now to the drawing and particularly to FIGS. 1 and 2 illustrating a preferred embodiment of the present invention, a rotary vacuum filter system 10 comprises a vat 12 and drum 14 assembly shown from the vat drive end 16. The vat is a rectangular tank 18 with watertight seams 20 having drum 14 mounted for rotation therein. The vat includes a feed box 22 into which a slurry to be processed is introduced to increase its consistency from approximately 1% to approximately 15%. A vacuum expression belt 24 overlies the drum for expressing filtrate from the filter cake 26 carried on the drum surface 28. The belt is mounted over spaced leading 30 and trailing rollers 32. A drive end frame 34 cooperating with a valve end frame 36 (FIGS. 11 and 12) support the belt rollers for rotation. A drive end support unit 38 receives end frame 34 for movement horizontally and vertically as more fully described below.

As shown schematically in FIG. 2, the drum unit operates through a filtration cycle identified in terms of the upper half of the drum cylinder. The drum is covered by a cloth filter member and receives a slurry coating or filter cake 26 from the feed box 22 and passes through a wash zone 40 defined by pipes 42, a vacuum expression zone 44, a vacuum cut-off zone 46, and a discharge zone 48. The series of pipes defining the wash zone introduce a suitable washing fluid for washing the filter cake processed by the drum. The vacuum expression zone is a fixed segment of the rotary drum. The surface of the rotating drum is continually exposed to a vacuum source (not shown) to draw filtrate from the filter cake to an external source through the valve end 50 of the filter drum. As is known, the drum is segmented and fitted with internal piping and valving so that the sector of the rotating drum being within the vacuum expression zone 44 is evacuated by a vacuum source. Typically, a partial vacuum with internal pressure of approximately 14" Hg is established within the drum for withdrawing filtrate.

After passing the vacuum cutoff zone 46, the filter cake is doctored from the drum and discharged.

A vacuum expression belt assembly 52 overlies the drum having the primary purpose of expressing the fluid from the cake and aiding the vacuum action of the drum filter. The vacuum expression belt 24 is supported by the vacuum expression assembly and includes end frame members 34, 36 with bearings 54 for receiving leading and trailing roller members for the purpose of carrying the vacuum expression belt for rotation in the direction shown by the arrow. The leading and trailing rollers apply no pressure to the filter cake carried by the drum and the vacuum expression belt rotates by reason of its engagement with the surface of the filter cake.

The vacuum expression belt frame assembly 52 is supported from splash panels 56, 58 (FIGS. 4 and 10) located at the drive 16 and valve 50 ends of the vat. The supporting mechanisms 38 and 60 for the frame assembly provide for vertically positioning the belt and frame assembly with respect to the drum, i.e., the belt and frame can be elevated from an operative lower position to an upper inoperative position best shown in FIGS. 8 and 9. The supporting members 38 and 60 provide for a second movement of the belt assembly frame which is a pivoting movement in a horizontal plane with the valve end support mechanism 60 preferably being the pivot end and the drive end support mechanism 38 preferably providing for slight horizontal transitory movement for purposes of adjusting the frame to promote true tracking of the belt with respect to the drum. As shown in FIGS. 3-8, the drive end support mechanism 38 includes a support platform 62 fitted to the splash panel and receiving a fixed base member 64. The fixed slide base has a dovetail surface 66 (FIG. 6) for receiving a slide member 68 for movement in a direction extending generally parallel to the drive end of the vat. The fixed 64 and sliding 68 base members are interconnected by a motor and gear drive 69 for moving the slide horizontally to left or right along the dovetailed interface as directed by the control unit described below. The extent of movement of the slide from a neutral point 65 is indicated by bench marks 67 appearing in FIGS. 6 and 7.

The sliding base receives a lift mechanism 70 including a lift housing 72 fitted to the sliding base 68 and a moveable support plate 74. The moveable support plate carries a support arm 76 for mounting end frame member 34 to a support pin 78. A position screw 80 aids in levelling the end frame 34.

As best shown in FIGS. 6 and 8, the lift mechanism includes a vertically oriented jackscrew 82 interconnecting fixed lift housing 72 and support plate 74 and for elevating plate 74 and consequently drive end frame 34. A motor and gear drive 84 actuate the lift mechanism 70 as directed by a control unit explained below in detail. The slide mechanism 64, 68 has an opening centrally thereof (not shown) to accommodate the downwardly extending jackscrew 82 which is located within a protective housing 86. A bellows member 88 is fitted to lift housing 72 and lift support plate 74 of the lift mechanism to protect the jackscrew and gear mechanism from the harsh environment generally existing in the plant.

It will be understood then that the drive end support mechanism provides for horizontal movement as well as vertical movement of end frame 34 as directed by the control unit.

Figure 5A:
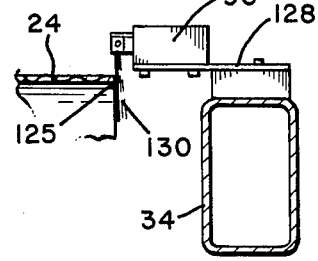
FIGS. 5a and b are section views taken along lines 5a—5a and 5b—5b of FIG. 3 for illustrating the neutral and actuated positions of belt location sensors for monitoring belt position.
Figure 5B:
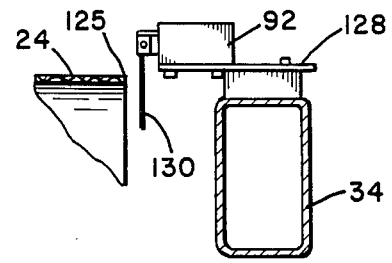

FIGS. 5a and 5b show section views of the drive side end frame 34 which is seen to be of tubular construction, preferably rectangular in cross-section. A pair of belt position sensors preferably limit switches 90, 92 are fitted to the drive end frame member for monitoring the location of the vacuum expression belt as fully described below.

Figure 9:
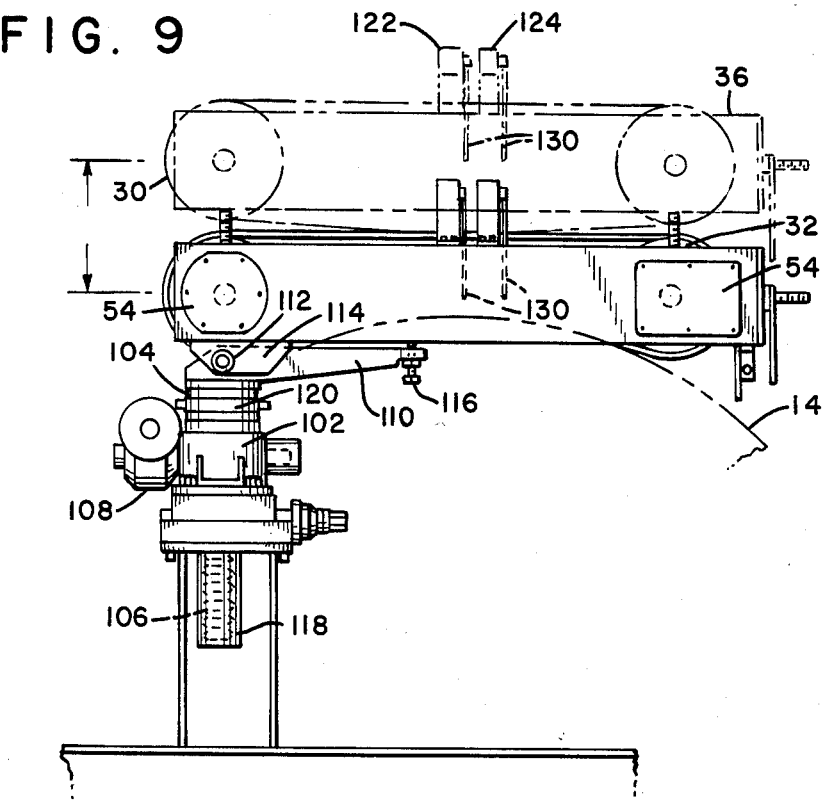
FIG. 9 is a front elevational view of the valve end showing the assembly for mounting the vacuum expression belt, with operative position shown in solid lines and inoperative position in broken lines.
Figure 10:
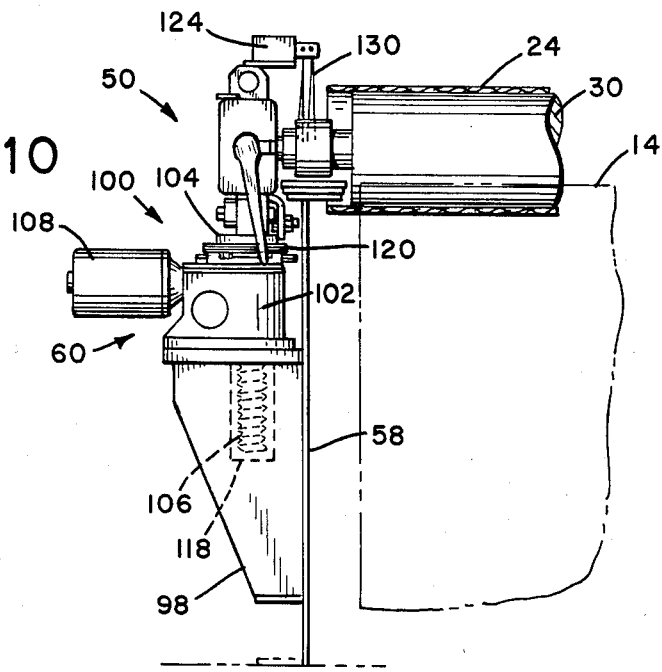
FIG. 10 is a fragmentary side elevation view thereof.

The valve end supporting arrangement 60 for the expression belt frame assembly is shown in FIGS. 9 and 10. The valve end supporting mechanism is similar to the drive end supporting mechanism, however, it does not include a horizontally sliding base. Accordingly, the support mechanism at the valve end is capable of two movements: a first vertical movement of the belt frame assembly from an operative position with the belt adjacent the drum to an inoperative position with the belt elevated above the drum, and a second movement in which the valve end frame 36 is pivoted slightly on a vertical axis. Referring to FIGS. 9 and 10, the valve end support mechanism 60 is mounted on a support plate 98 fitted to the valve end splash panel 58. The support mechanism includes a lifting mechanism 100 comprising lift base 102 and moveable plate 104 interconnected by a jackscrew 106 and driven by a motor gear box 108 substantially in the same manner as for the drive end. The lifting plate 104 receives horizontally extending support arm 110 which receives the support frame by a pin 112 and bracket 114 arrangement. A bolt member 116 is provided for adjustment and support of the frame with respect to the drum. The jackscrew is protected by housing 118 and bellows 120. By this arrangement, the valve end frame pivots vertically about the center line of jackscrew 106 in response to horizontal sliding movement of drive end frame 34. The valve end frame also moves vertically in response to actuation of motor gear unit 108 by the control unit.

As shown in FIG. 9, the valve end end frame includes a pair of belt position sensors preferably in the form of limit switches 122, 124 for a purpose to be described.

In operation the rotary drum vacuum filter unit functions with express belt being drawn by vacuum to express filtrate from filter cake with the belt rotating as it engages the filter cake.

The tracking of the belt in this application is essentially the same as tracking on any system of three rolls with a belt, the difference being that the drum roll is of much larger diameter than the leading and trailing belt rollers. Additionally, it must be kept in mind that the vacuum express belt is operating under vacuum through its inner run in engagement with drum and filter cake. Under these circumstances, the vacuum expression belt will tend to drift toward one end or the other of the drum in operation. By moving the leading and trailing belt rollers at the same time at one end of the vacuum express belt supporting frame, the belt will move to restore itself to normal tracking position. Effectively, this is the same as moving the drum in the opposite direction to restore the belt to proper tracking condition, that is, the belt will always climb towards the hill, that is a higher spot in the tracking operation.

According to the present invention, a control system 126 (FIG. 3) continually monitors the operating location of the belt from the drive and valve ends of the drum. As best shown in FIGS. 3–5 and 9–10 the control system includes two sets of belt position sensors preferably in the form of limit switches 90, 92 and 122, 124 positioned on drive and valve end frames 34 and 36 respectively. Each pair of limit switches is mounted on their end frame within a predetermined distance of an edge 125 of the upper run of the belt. As shown in FIGS. 5a and 5b, the drive end limit switches include inner and outer limit switches which are representative also of the valve end switches. The limit swiches are mounted to drive end frame 34 by suitable supports 128 with detectors 130 located in proximity to belt edge 125. The inner limit switches on both sides of the belt are connected through control system 126 to drive motor 69 for slideably adjusting the belt frame on the drive end of the vat. That is, the inner limit switch 90 positioned on the drive end of the vat actuates the control system to move the sliding base and belt frame toward the feed box such that the vacuum expression belt will move towards the other end of the drum, i.e., the valve end. The corresponding limit switch 122 positioned at the valve end of the support frame when engaging the edge of the upper run of the belt 24 will actuate the control motor at the drive end to move the support frame horizontally toward the discharge side of the system in order to restore the belt to operating position near the drive end.

The control system includes a timing mechanism so that for each adjustment of the slideable support there is a time delay after which further or continuous actuation of the inner limit switch will cause an additional incremental movement of the frame in the same direction to urge the vacuum expression belt to return to normal tracking position. This procedure can be repeated as necessary to bring the edge of the vacuum expression belt out of contact with the inner limit switch.

When directives given by the control unit in response to actuation of the inner limit switch do not restore the belt to a normal tracking position, then an outer limit switch 92 or 124, being actuated, indicates a major operational problem in tracking the belt and, in turn, directs the lift mechanism motors 69 and 108 immediately to lift the entire belt frame assembly out of contact with the rotary drum and filter cake until such time as the tracking problem is diagnosed by operating personnel and resolved. It will be understood that since the belt is not independently driven it will come to rest shortly after being removed from contact with the filter cake and drum.

As a further safety measure, there are limit switches 134, 136 (FIG. 6) positioned with respect to the slideable frame 68, so that in spite of repeated movement and time delay it is apparent that the belt tracking problem is not being resolves this linear limit switch will cause the lift mechanism motors 69 and 108 immediately to lift the belt out of contact with the drum and filter cake.

Figure 11:
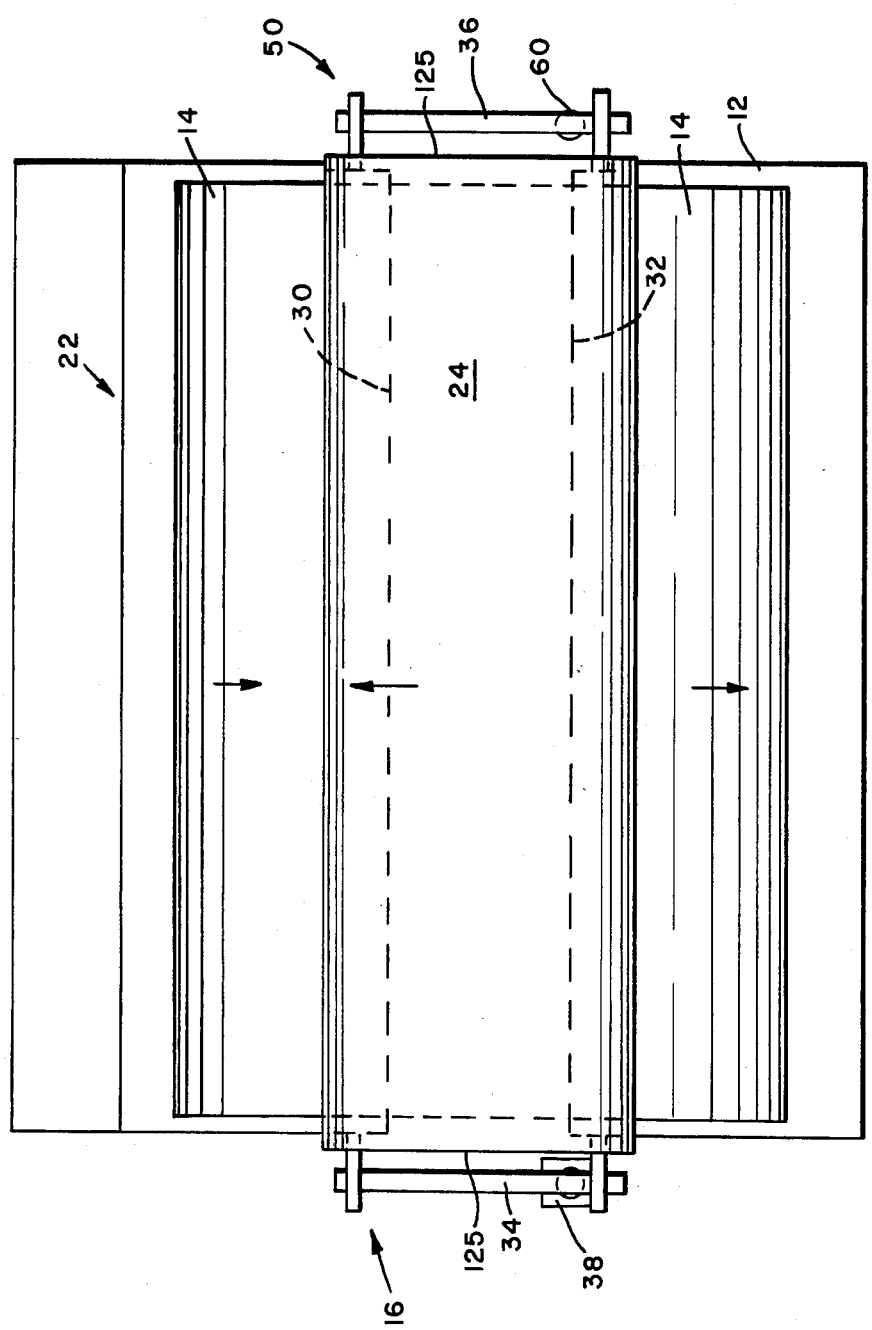
FIG. 11 is a plan view showing the vacuum expression belt positioned with respect to the rotary drum vacuum filter.
Figure 12:
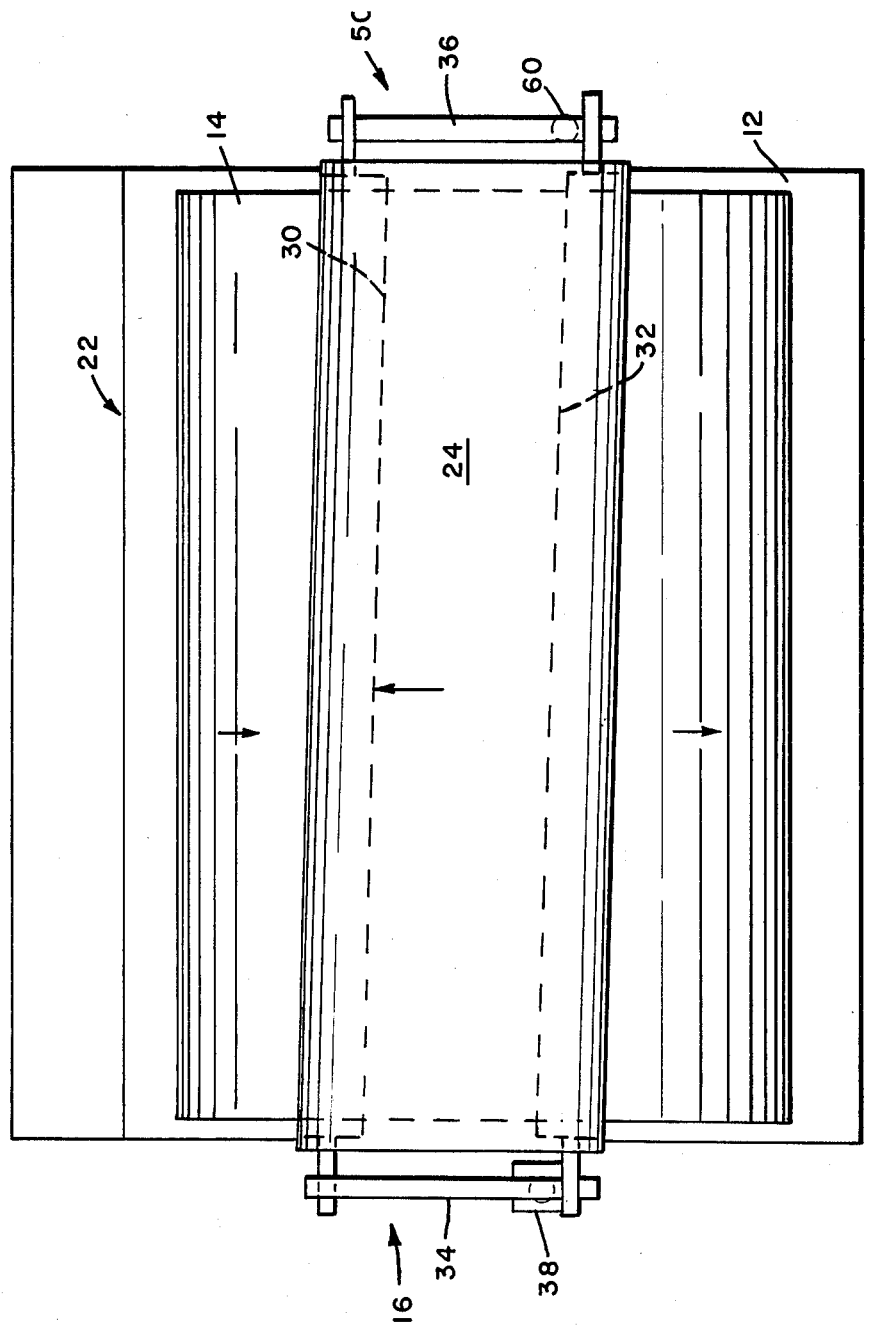
FIG. 12 is a view corresponding to FIG. 11 in which the sliding base at the drive end of the drum unit has been shifted to cause the belt to move toward the opposite end (valve end) of the vacuum filter unit.

In operation, a slurry of approximately 1% consistency is fed into the vat and the rotating drum carries a layer of filter cake to the discharge side of the vat where, as a result of filtrate removal, the consistency has increased to 15%. As shown in FIGS. 11 and 12, the vacuum expression belt engages the filter cake and expresses filtrate in the vacuum expression zone. The expression belt rotates by virtue of its engagement with the filter cake. During rotation the belt tends to drift laterally either toward the drive or the valve end of the drum. If either of the inner limit switches 90, 122 is actuated the control system pivots the belt assembly in a direction to restore true belt tracking. For example, if the belt drifts toward the valve end, the control unit actuates the sliding base to move incrementally toward the feed box side of the vat. The maximum excursion of the sliding base is approximately four inches. The normal setting for the sliding base is a null or neutral position with the control unit capable of adjusting the sliding base two inches left and two inches right of neutral. Accordingly, when the valve end inner limit switch is actuated the control unit directs the sliding base motor to move approximately one-quarter inch ($\frac{1}{4}''$) toward the discharge side of the vat. The pivoting of the belt frame in this way tends to restore the belt to true tracking position. A time delay of up to two minutes ensues to determine whether the belt has been restored to normal position. The duration of the time delay is selected according to drum and belt speed. At greater speeds a shorter time delay would be used and a longer delay for slower drum speeds. For convenient reference, the distance moved from neutral is indicated on the slide mechanism as shown in FIG. 7. If, after expiration of the time delay, the valve end inner limit switch is still engaged, then the control unit again directs the slide motor to move the base another one-quarter inch ($\frac{1}{4}''$). This procedure can be repeated until true belt tracking is restored. In practice and under normal operating conditions it is not necessary to move more than five one-quarter inch kicks before proper belt tracking occurs.

In the event the full excursion of the sliding base is exceeded in either direction, a limit switch 134 or 136 will actuate the control unit and the jack motors will lift the belt frame assembly to inoperative position until the problem is corrected.

In the event of abnormal operation with the belt drifting laterally beyond tolerable limits, the belt will engage an outer limit switch on either the drive or valve end, and the jack motors will immediately lift the belt frame assembly until the malfunction is identified and cured.

Accordingly, it will be understood that according to the present invention a vacuum expression belt tracking system is provided which under normal operating conditions maintains the belt in operative expression relationship with filter cake for the purpose intended and that when abnormalities occur in tracking, the belt is immediately removed to an inactive position for protective of the belt and integrity of the basic slurry operation.

Having thus described my invention, I claim:

1. A rotary drum vacuum filter comprising a vat having a drum rotatably mounted therein, said vat having means defining infeed and discharge zones, a vacuum source applied to a sector of the drum surface to define a vacuum expression zone thereon, a vacuum expression belt assembly for increasing the consistency of filter cake carried by the drum, said belt assembly including a belt for expressing filtrate from the filter cake in said vacuum expression zone, said expression belt mounted on spaced leading and trailing support rollers fixed in parallel alignment, the ends of said support rollers journaled in a pair of end frames, each end frame rigidly extending between said rollers to maintain the parallel alignment of said rollers, first and second spaced support means at opposite ends of said vat in supporting contact with said end frames, means for pivoting said first support means about a vertical axis, said second support means mounted on a sliding base which is moveable in a horizontal plane, drive means for actuating said sliding base, monitoring means for detecting lateral drift of said belt, said drive means responsive to said monitoring means to move said sliding base horizontally, the horizontal movement of said sliding base with the support means and end frame mounted thereon causing said first support means to pivot with the end frame mounted thereon, the rollers thereby pivoting with the end frames to counter the lateral drift of said belt.

2. The rotary drum vacuum filter of claim 1 further comprising means for lifting said vacuum expression belt assembly including the support rollers and end frames to an inoperative position in the event the belt drifters laterally beyond a predetermined limit.

3. The rotary drum vacuum filter of claim 2 wherein said monitoring means comprises two sets of inner and outer limit switches located in proximity to opposite edges of the belt and with each set spaced laterally of a belt edge to define tolerable limits of belt drift.

* * * * *